April 24, 1956  H. C. RHODES  2,742,867
FLOUR DUSTER
Filed May 13, 1953
2 Sheets-Sheet 2
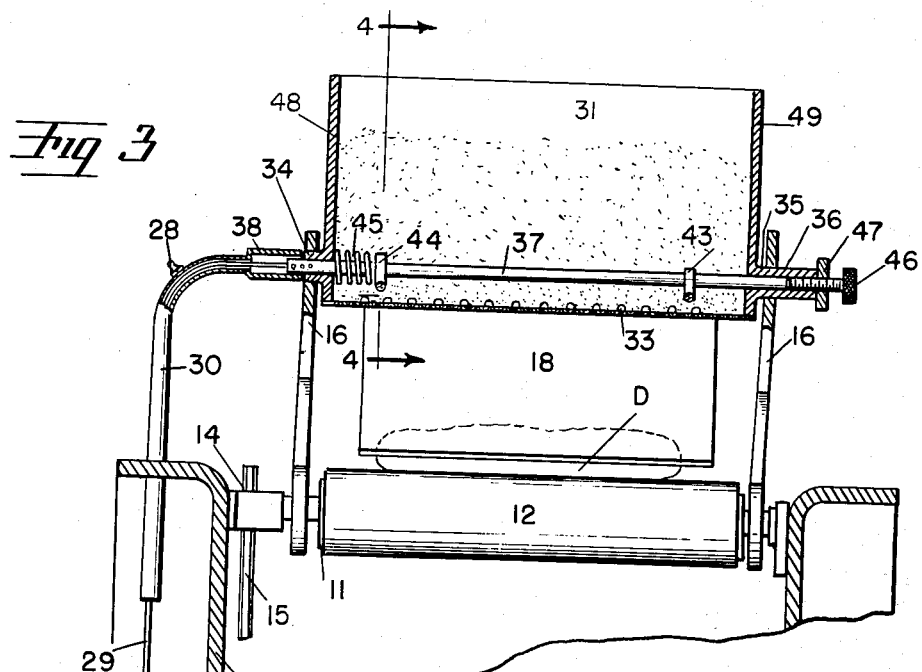
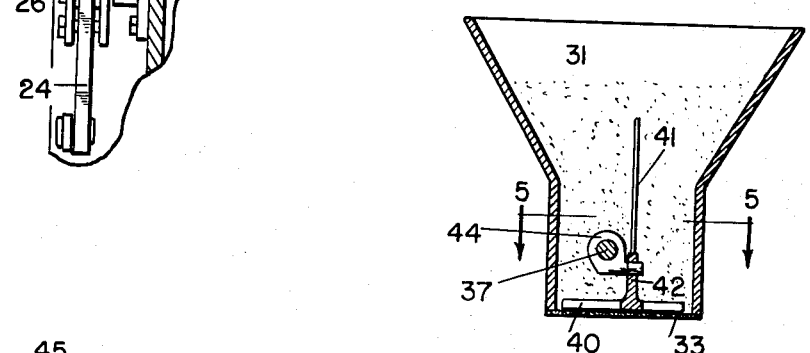
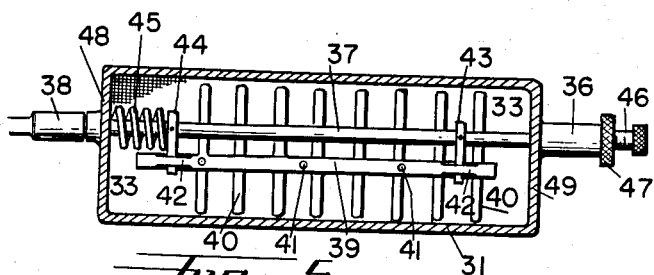
INVENTOR.
HERBERT C. RHODES
BY
ATTORNEY 2,742,867
FLOUR DUSTER Herbert C. Rhodes, Portland, Oreg., assignor to Read Standard Corporation, a corporation of Delaware Application May 13, 1953, Serial No. 354,841

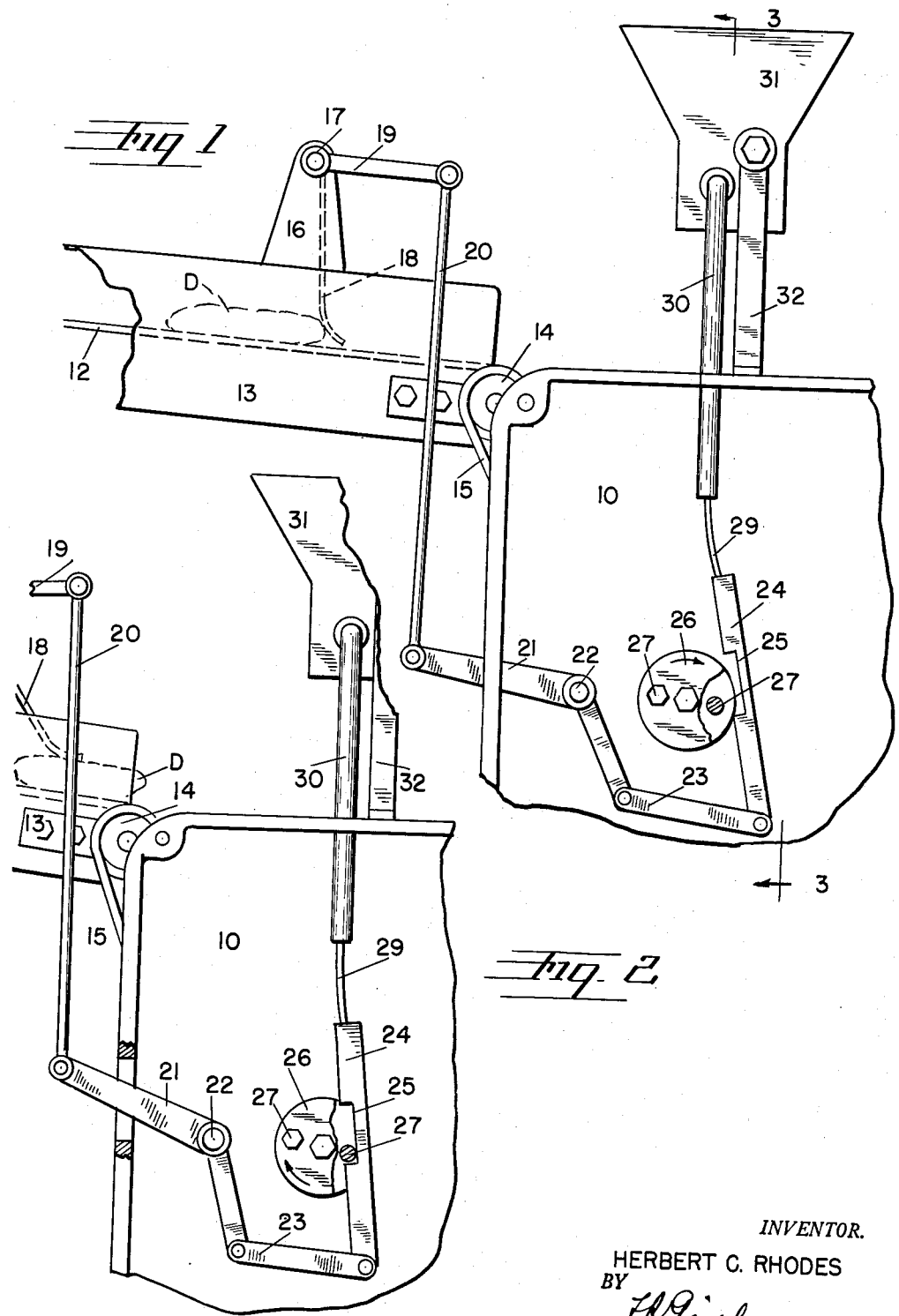

1 Claim. (Cl. 107—7)

This invention relates to the dusting of flour on dough, and particularly on dough molding rolls, in the process of making bread and similar bakery products. As is well known, it is customary to dust a thin film of flour on one or more molding rolls in a dough molding machine, or on the dough itself, to prevent any of the dough from sticking to the surface of the molding rolls. Various devices have been developed for performing such flour dusting, which devices are operated in various ways, as, for example, by causing vibration of a screen on which flour is deposited, or by causing vibration of an agitator element above the flour sifting screen. The general object of this invention is to provide an improved and simplified device and improved means for operating such device for performing the desired flour dusting.

More specifically, an object of this invention is to provide an improved and adjustable flour duster which will cause the dusting of the flour to take place only when needed, that is, only when a dough piece is passing through the dough molding machine, and will thus avoid any unnecessary dusting and wasting of the dusting flour.

Another object of the invention is to provide an improved and simplified flour dusting means which will not require any outside source of power, such as electric power or compressed air, for its operation, but which will be operated entirely by mechanical power take-off from the dough molding machine.

These objects and other incidental advantages are achieved with my improved flour duster in which the movement of the dough pieces automatically will cause the dusting to take place, and which improved duster is constructed and operates in a manner which will be readily understood from the following description with respect to the accompanying drawings.

In the drawings:

Fig. 1 is a fragmentary side elevation of the duster assembly and adjacent portions of the dough-delivering means and dough molding machine, the outer side plate of the dough molding machine having been removed for clarity, and this view showing the duster assembly in inoperative position;

Fig. 2 is a corresponding fragmentary side elevation showing the duster assembly in operating position;

Fig. 3 is a fragmentary transverse sectional elevation taken on line 3—3 of Fig. 1;

Fig. 4 is a sectional elevation of the flour-delivery hopper taken on line 4—4 of Fig. 3; and Fig. 5 is a plan section taken through the hopper of the flour duster on line 5—5 of Fig. 4.

Referring to Fig. 1, the side frame of a dough molding machine is indicated by the reference character 10 (the outer face plate of this side of the machine having been removed). It is to be understood that the dough molding machine is of a well known type in which a plurality of molding rolls rotate. The pieces of dough, one of which is indicated by the reference character D, are delivered from a dough mixer (not shown) on to an endless traveling belt 12 which moves the dough from left to right (as viewed in Fig. 1) and conveys the individual dough pieces to the dough molding machine in the customary manner. In order to prevent any dough from sticking to the holding rolls in the dough molding machine, flour from a hopper 31 is dusted on to the rolls as each piece of dough passes into the dough molding machine.

The flour container or hopper 31 is positioned above the dough molding machine, approximately in the position indicated in Fig. 1, and is supported at its ends on brackets 32, one of which is shown in Fig. 1, the bottom ends of which brackets are secured in any suitable manner to the respective sides of the dough molding machine frame. The bottom of this hopper 31 comprises a fine screen or perforated plate 33 (Figs. 3, 4 and 5) which permits the sifting of the flour therethrough under certain conditions, as hereinafter mentioned.

One of the end walls 48 (Fig. 3) of the hopper 31 is formed with an outwardly flanged opening 34 near the bottom of the hopper. A corresponding opening 35 on the opposite end wall 49 is in transverse horizontal alignment with the opening 34, and a cylindrical housing 36, either formed integral with the hopper wall or welded or otherwise firmly secured thereto, extends outwardly in axial alignment with the two openings 34 and 35. A shaft 37, extending horizontally across through the lower portion of the hopper 31, has its ends slidably supported in the openings 34 and 35 respectively.

A flour agitator and screen scraper is located in the bottom of the hopper 31 and rests on the bottom plate or screen 33. As shown in Fig. 5, this agitator has a main longitudinally-extending rib 39 from which a plurality of spaced lateral horizontal fingers 40 extend. These fingers 40 act as scrapers on the top face of the bottom plate 33 and when moved on the top face of the plate cause flour to be sifted through the perforations on the plate.

A pair of spaced ears or loops 42 are mounted on the top of the main rib 39. Collars 43 and 44 are secured on the shaft 37 by suitable set screws. Each of these collars has a laterally-extending finger which engages one of the ears 42 of the agitator, as shown in Figs. 4 and 5. Thus, when reciprocating longitudinal movement is imparted to the shaft 37, the agitator will be correspondingly reciprocated on the bottom plate of the hopper 31. Preferably the agitator is also provided with vertical fingers 41 extending upwardly from the main rib 39, which vertical fingers serve to prevent the flour in the upper portion of the hopper from becoming too tightly compacted.

The interior of the cylindrical housing 36 (Fig. 3) is screw threaded so as to accommodate a screw plug 46, which plug is adjustably mounted in the outer end of the housing 36. The screw plug 46 terminates in a head, the periphery of which preferably is knurled so as to facilitate manual adjusting of the plug 46, and a lock nut 47 prevents any inadvertent turning of the screw plug in the cylindrical housing 36.

A coil spring 45 is mounted on the shaft 37 and is held under compression between the collar 44 and the adjacent end wall 48 of the hopper. Thus, as apparent from Figs. 3 and 5, the spring 45 exerts a force thrusting the shaft 37 to the right to the extent permitted by the screw plug 46.

The left hand end of the shaft 37, as viewed in Fig. 3, is secured to the end of a wire or fine wire cable 29. This cable 29 passes through a tubular housing 30. The tubular housing 30 is formed with a 90° bend, the upper end or horizontal portion of the housing being attached by a suitable nipple 38 to the flange surrounding the opening 34 in the hopper wall. The vertical or downwardly-extending leg of the tubular housing 30 extends through an opening provided in a top flange of the side wall 10 of the machine frame and terminates a short distance below this top flange. The tubular housing 30 is provided preferably with a grease valve 28 through which suitable lubricant may be injected into the housing to facilitate the sliding of the cable 29 therein and to prevent excessive wearing of the tubular housing or cable.

The bottom end of the cable 29 is attached to a notched bar 24 (Figs. 1, 2 and 3) which bar is formed with a central notch 25 as illustrated. The bottom end of the bar 24 is pivotally connected to a link 23, one end of the link being pivotally connected to a bell crank 21. A pivotal mounting 22 is provided on the machine frame wall 10 for the bell crank 21.

A rotating spool-like element 26, consisting of a pair of spaced discs connected by symmetrically-positioned cross bars or pins 27, is secured to the outer end of the shaft of one of the dough rolls of the dough molding machine. This rotating element 26 and the notched bar 24, together with the link 23 and bell crank 21, are so positioned and arranged with respect to each other that when the bell crank 21 is in the position illustrated in Fig. 1, the bar 24 will be held out of the path of the cross bars 27 of the rotating element 26, but when the bell crank 21 is given a partial clockwise rotation (as viewed in Fig. 2), the bar 24 will then engage the element 26. The result of such engagement of the bar 24 with the rotating element 26 (the element 26 rotating in clockwise direction as indicated by the arrows in Figs. 1 and 2) will be to cause a downward pull to be exerted on the bar 24 (and thus on the attached cable 29) as each cross bar 27 of the rotating element 26 contacts the bottom shoulder of the notch 25 of the bar 24.

As apparent from Fig. 3, any downward pull on the cable 29 will cause endwise movement of the shaft 37 and therewith of the agitator in the hopper 31, such movement being against the force of the spring 45, and subsequent release from such downward pull will result in the shaft 37 and agitator moving in the opposite direction under the force of the spring 45. Consequently, as long as the bar 24 is in position to be engaged by the moving cross bars 27 of the rotating element 26, and thus in the position illustrated in Fig. 2, the rotation of the element 26 will result in reciprocation of the shaft 37 and of the agitator within the hopper 31. The extent of such reciprocatory movement of the shaft 37 and agitator will depend upon the adjustment of the screw plug 46 as evident. The rapidity of such reciprocation will depend upon the number of cross bars 27 in the rotating element 23 and also on the speed with which the element 26 is rotated. While only two diametrically-opposite cross bars 27 are shown in the element 26 in Figs. 1 and 2, it will be apparent that this number could be increased if desired and thus produce more rapid reciprocation under the same speed of rotation of the rotating element 26 and of the dough molding roll with which it is connected.

The endless traveling belt 12 (Figs. 1 and 3), on which the dough pieces D are delivered to the dough molding machine, is supported in a frame assembly 13. At the discharging end of this assembly 13 the endless traveling belt 12 passes around a roller 11 and this roller may be driven from the dough molding machine through the intermediary of the sprocket chain 15 passing around a drive sprocket (not shown) in the dough molding machine and around the sprocket 14 attached to the shaft of the roller 11.

A pair of brackets 16, one of which is shown in Fig. 1, are secured to the respective sides of the frame assembly 13 near the discharging end of the endless traveling belt 12. A shaft 17 is rotatably journaled in these brackets 16 at a spaced distance above the traveling belt 12. A dough-engageable trip plate 18 is attached to the shaft 17, and, as indicated by the broken lines in Fig. 1, this trip plate extends down into the path of the dough pieces carried by the belt 12. Thus as each dough piece encounters the trip plate 18 it will cause the trip plate to be swung slightly in the direction of the travel of the moving dough piece until the dough piece has passed beyond the trip plate, whereupon the trip plate is permitted to swing back down to its normal position.

An arm 19 is rigidly secured to the shaft 17 so that any movement of the trip plate 18 results in a corresponding movement of the arm 19. A link 20 connects the arm 19 with the bell crank 21.

The movement of the trip plate 18 thus produces movement of the bell crank 21, which in turn moves the notched bar 24 into and out of engagement with the rotating element 26. As a result, the agitator in the hopper is actuated for a moment as each piece of dough passes under the trip plate 18. The movement of the agitator causes flour to be sifted from the bottom of the hopper 31, descending on the dough molding rolls as a fine dust and reaching the rolls at approximately the same time as the piece of dough which has caused the agitator to be actuated. The dusting of the flour takes place only when dough is being delivered into the dough molding machine and no excessive, unnecessary or wasteful dusting of the flour occurs. Increasing the reciprocal stroke of the shaft 37 (and therewith of the agitator), by moving the limit screw plug 46 outwardly, increases the amount of flour discharged with each dusting operation, and vice versa.

Since the downward thrusts on the bar 24, in opposition to the spring 45, are produced entirely by intermittent engagement of the shoulder in the notch 25 of the bar 24 with the rotating element 26, and since only very little force is required to move the bar 24 towards or away from the rotating element 26, the return swing of the trip plate 18 down to normal position, when disengaged from a moving dough piece, is all that is required to move the bar away from the rotating element 26, and no supplemental power is required in the automatic operation of the adjustable flour duster.

I claim:

Actuating means for reciprocating the agitator assembly of a flour duster of a dough piece handling machine in response to passage of a dough piece therethrough, said actuating means comprising a spring biasing said agitator assembly in one direction, a revolving engageable element, a bar having a shoulder adapted for alternate engagement and disengagement by said revolving engageable element when said bar is moved into the path of revolution of said revolving engageable element, a flexible connecting member connected at one end with said agitator assembly and at the other end to said bar for pendently supporting said bar from said agitator assembly adjacent said revolving engageable element, said bar and flexible connecting member being swingably movable independently of said agitator assembly between an extended position wherein said bar is in the path of movement of said revolving engageable element, and a retracted position wherein said bar is out of the path of movement of said revolving engageable element, said revolving engageable element in its descending path of movement engaging the shoulder of said bar when said bar is in its extended position to depress said pendently supported bar, thereby moving said agitator assembly in one direction through said flexible connecting member against the pressure of said spring, said revolving engageable element on further movement in its descending path being released from engagement with the shoulder of said bar whereby said agitator assembly is moved in the opposite direction by the pressure of said spring, and means responsive to a passing dough piece for moving said bar from its retracted to its extended position.

References Cited in the file of this patent

UNITED STATES PATENTS

| | | |
|---|---|---|
| 1,620,559 | Kirchoff | Mar. 8, 1927 |
| 1,642,519 | Tiedke | Sept. 13, 1927 |
| 1,970,336 | Pointon | Aug. 14, 1934 |
| 2,066,899 | Parsons | Jan. 5, 1937 |
| 2,142,373 | Plambeck | Jan. 3, 1939 |
| 2,579,514 | Rhodes | Dec. 25, 1951 |
| 2,633,242 | Rhodes | Mar. 31, 1953 |